Nov. 16, 1965 C. R. BROCK ETAL 3,218,607

UNDERWATER TELEPHONE

Filed Dec. 10, 1962 2 Sheets-Sheet 1

INVENTORS
C. R. BROCK
R. J. CYR

BY John E. Wagner
ATTORNEY

INVENTORS
C. R. BROCK
R. J. CYR

BY John E. Wagner
ATTORNEY

United States Patent Office 3,218,607
Patented Nov. 16, 1965

3,218,607

UNDERWATER TELEPHONE

Charles R. Brock, Granada Hills, and Reginald J. Cyr, Woodland Hills, Calif., assignors to Bendix Corporation, North Hollywood, Calif., a corporation of Delaware Filed Dec. 10, 1962, Ser. No. 243,282
9 Claims. (Cl. 340—5)

This invention relates to signal-transmission systems and more particularly to voice-modulated, compression-wave telephone systems for use in underwater communications.

Without a doubt the greatest limitation encountered by underwater swimmers employing self-contained underwater breathing apparatus, commonly called SCUBA gear, is the lack of any adequate communication system. Visual systems for use between divers have range limitations measured in a few feet and under conditions of turbid water are ineffective. Wired telephone systems for operation between divers or between one diver and the surface have been proposed, but such systems immediately compromise the greatest advantage of SCUBA equipment, that of complete freedom of mobility on the part of the swimmer.

There have been attempts to produce voice communications systems employing in one system low-frequency (5–10 kc.) sonar type transmissions, and in another system modulated direct current flowing between a pair of spaced electrodes on the swimmer's body. In both cases the systems have been deficient, particularly with respect to intelligibility of received signal and complexity and weight of equipment required.

It is a general object of this invention to provide an underwater communications system offering a high degree of speech intelligibility approaching 100% over a range of up to 500 yards.

Another object of this invention is to provide a system of such simplicity, limited volume and weight that the entire system can be worn as a headset.

Still another object of this invention is to achieve a high degree of signal intelligibility through the use of automatic gain control in the receiving channel of the system and automatic desensitizing of the receiving channel during transmission.

One further object of this invention is to obtain the intelligible transmission of speech through a water medium employing a compressional wave carrier of frequency corresponding to the limited frequency band in which sea water exhibits definitely superior transmission properties for short range.

These objects are all accomplished in accordance with this invention in which one embodiment comprises a headset assembly including one ear-covering portion enclosing an earphone and a matching portion constituting a battery case. An interconnecting resilient band holds the assembly on the swimmer's head and carries a central enlarged portion containing the electronic circuitry of the system. Centermost in the interconnecting band a transducer is mounted oriented to introduce or receive compressional waves either omnidirectionally or along an axis generally parallel to the length of swimmer's torso depending upon the transducer design.

The electrical circuit of the communications system constitutes an amplitude-modulated, double side-band transmitter driving an electrostrictive transducer of the ceramic type and a receiver circuit having its input connected to the same transducer. The receiver employs three stages of carrier frequency amplification followed by a diode detector, voltage doubler and two stages of audio frequency amplification. An automatic gain-control circuit is operative in the receiver in both transmit and receive modes of operation.

One feature of this invention involves a sonar type communications system in which an entire station comprises a headset containing the power source, switching controls, earphone, circuitry and the transmitting-receiving transducer, the last mounted centermost on the headband portion to allow directional control of transmission with movement of the wearer's head when a directional transducer is used.

Another feature of this invention resides in the presence of an automatic volume-control circuit under the control of both the transmitter and receiver sections, operative to maintain a desired signal level in receiver operation and to disable the receiver branch during transmission.

One other feature of the invention resides in the circuitry and transducer combination for producing a normal operating frequency well above the normal submarine signaling frequencies, but in a frequency range which gives optimum transmission with high intelligibility.

These and other features of this invention may be more clearly understood from the following detailed description and by reference to the drawing, in which.

Figures 1, 2:
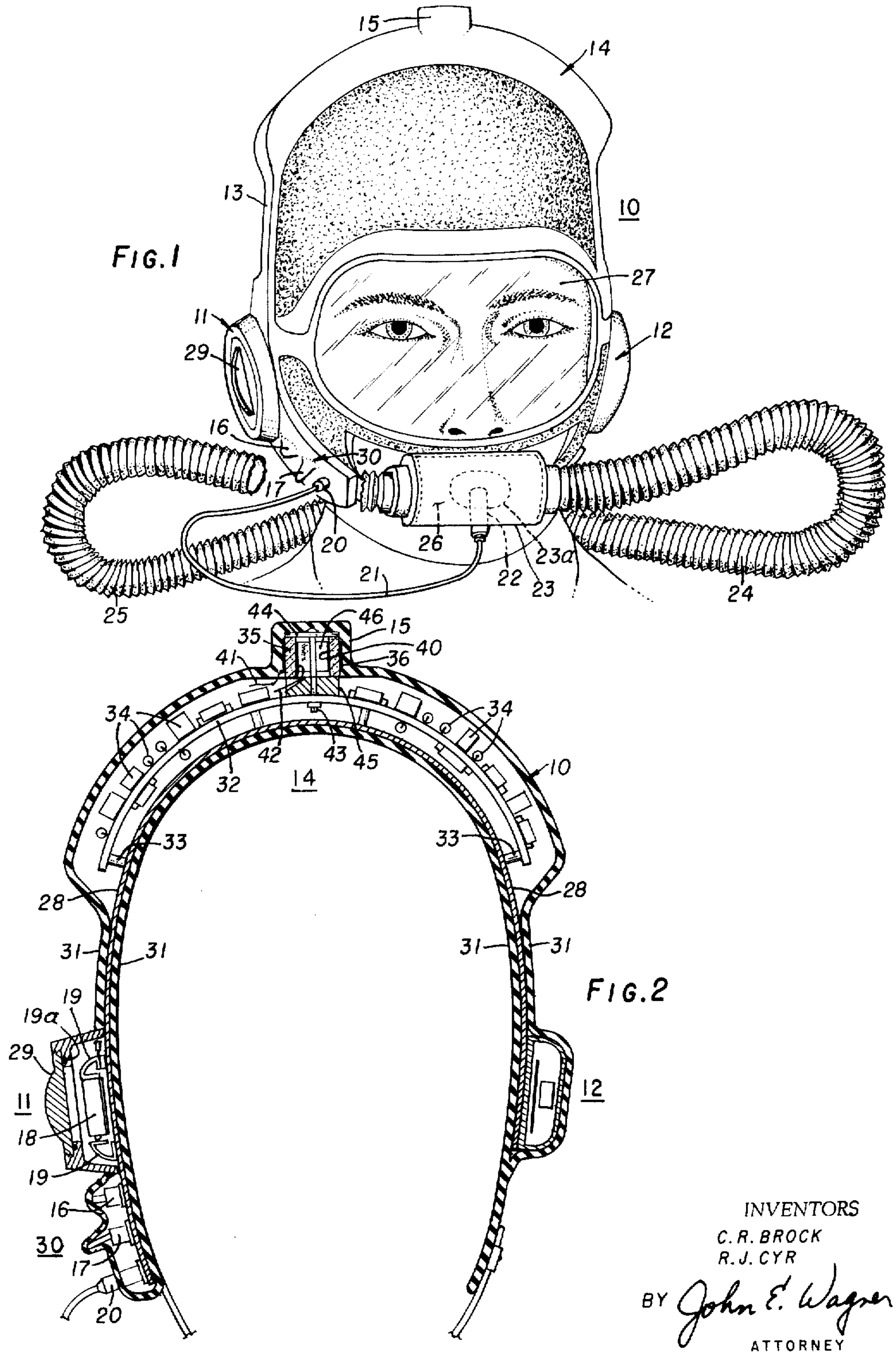
FIG. 1 is a pictorial representation of an underwater communications unit of this invention as worn by a swimmer.
FIG. 2 is a vertical section through the apparatus of FIG. 1.

Now referering to FIG. 1, the communications system of this invention comprises primarily a headset designated generally 10 having a pair of earphone sections, one of which constitutes a battery case 11 overlying the wearer's right ear, and the other contains an actual earphone 12. A headband 13 connecting the earphones 11 and 12 is rubber-covered steel mounting a central enlarged electronic circuit package 14, also rubber-covered and having a central protuberance 15 enclosing a transducer shown in FIG. 2. The headband 13 extends below the earphone 11 to mount a rubber-sealed function control or press-to-talk switch 16, an on-off switch 17 and a connector 20 for a transmitter lead 21 connecting a microphone transmitter 22 to the communications system. The transmitter 22 shown in dashed lines is normally mounted in the mouthpiece 23 of underwater breathing apparatus, unshown in the drawing except for hoses 24 and 25 and the mouthpiece 23. As shown in FIG. 1, the transmitter extends into the center of the air chamber 26 of the mouthpiece 23 for reception of speech passing through the large breathing orifice 23*a*, shown by dashed lines within the mouthpiece 23. As shown, the swimmer wears a face mask 27 covering only the eyes and nose, with the mouthpiece 23 and transmitter 22 as a separate unit. When the swimmer uses a full face type mask covering the eyes, nose and mouth, the transmitter may be mounted anywhere within the face mask and desirably away from the immediate areas of the air passages to reduce the level of air movement noise at the transmitter.

As is apparent from FIG. 1, the entire system is carried by the swimmer's head, thereby not encumbering his torso or hands. Hand action is required only to operate the on-off switch 17 at the beginning and end of submerged operations and to transmit by closing the non-locking press-to-talk button 16. Directional control of transmission, when employing a directional transducer, is accomplished by movement of the head which changes the orientation of the transmitting-receiving transducer contained within the protuberance 15. Where the omnidirectional transducer is used, directional control is possible by shadowing or shielding transmissions by placing the hand or forearm beside the transducer to block transmissions in one direction. The attenuation of acoustic energy in the 50-kilocycle frequency range by the swimmer's hand, or preferably neoprene foam jacketed forearm, is great, allowing effective beaming of energy.

More details of the physical arrangement of the apparatus are apparent from the vertical sectional view of FIG. 2. There the frame of the apparatus, a spring steel band 28, mounts the three groups of components, the battery and switch assembly generally designated 30, the earphone 12, and the electronics package 14, all in their reception positions over the swimmer's ears and on top of his head. The steel band 28, and three apparatus groups 12, 14 and 30 are all sealed from surrounding water, except for a battery access opening, by an enclosing rubber membrane-like covering 31 in the order of ⅛ inch thick. The covering is sufficiently pliable to allow the operation of the on-off switch 17 and the press-to-talk switch 16 through the covering 31 in the conventional manner for water-sealed switches.

The earphone 12 is mounted directly on the steel band 28, and transmission to the user's ear is by conduction through the band 28 and covering 31 to the user's right ear, adjacent to the earphone 12. The excellent acoustic transmission properties of the band 28 result in sound conduction through the length of the band 28 to the region of the user's left ear, as well, affording a limited degree of binaural reception despite the use of a single earphone.

The battery pack 11, correspondingly roughly in size and position to the earphone 12, includes one or more cells 18, for example, a conventional dry battery, sufficient to provide a working potential of 9 volts for the transistor circuitry of package 14. Battery drain for the circuitry of this invention is in the order of 20 milliamperes when in the receiving mode of operation and 60 milliamperes while transmitting, the latter providing an acoustic output power of 200 milliwatts into the transducer. Battery exchange is accomplished by unscrewing the battery package cover 29 from the headset 10, unplugging the battery 18 from internal spring contacts 19. A watertight seal for the battery package is provided by an O-ring beneath the cover 29 resting in a circular groove **19*a* in the battery case 11**.

The largest of the three assemblies, the electronic package 14, includes a printed circuit board 32 conforming to the curve of the band 28 and mounted thereon through a series of spacers 33, one or more of which constitute conductive connectors between the circuit of board 32 and the head band 28, the latter of which serves as the system ground conductor. The electrical components, generally designated 34, forming the circuit of FIG. 3 are mounted on the printed circuit board 32 having integral conductive interconnections all in accordance with conventional printed circuit techniques.

Centrally mounted on the printed circuit board and extending into the protuberance 15 is the transducer 35, an electroceramic tubular member having deposited conductive coatings 36 and 40 on the outer and inner cylindrical surfaces thereof.

Flexible leads 41 and 42 connect the electrode coatings 36 and 40 to the printed circuit board 32. The transducer 35 is secured to the printed circuit board 32 by a central screw 43, the head of which bears on an upper plate 44, the body passing through a spacer 45 and the opposite end secured by a nut to the band 32. The interior of the transducer is filled with pressure-release material 46, for example foam rubber, or a mixture of cork and neoprene rubber. The outer surface of the transducer 35 is in bonded contact with the covering 31 for efficient coupling of compressional waves between the surrounding medium and the transducer 35 operating in the radial mode. The remainder of the interior of the electronic circuit package may remain air filled or may otherwise be filled with suitable insulating material such as silicone rubber.

Figures 3, 4:
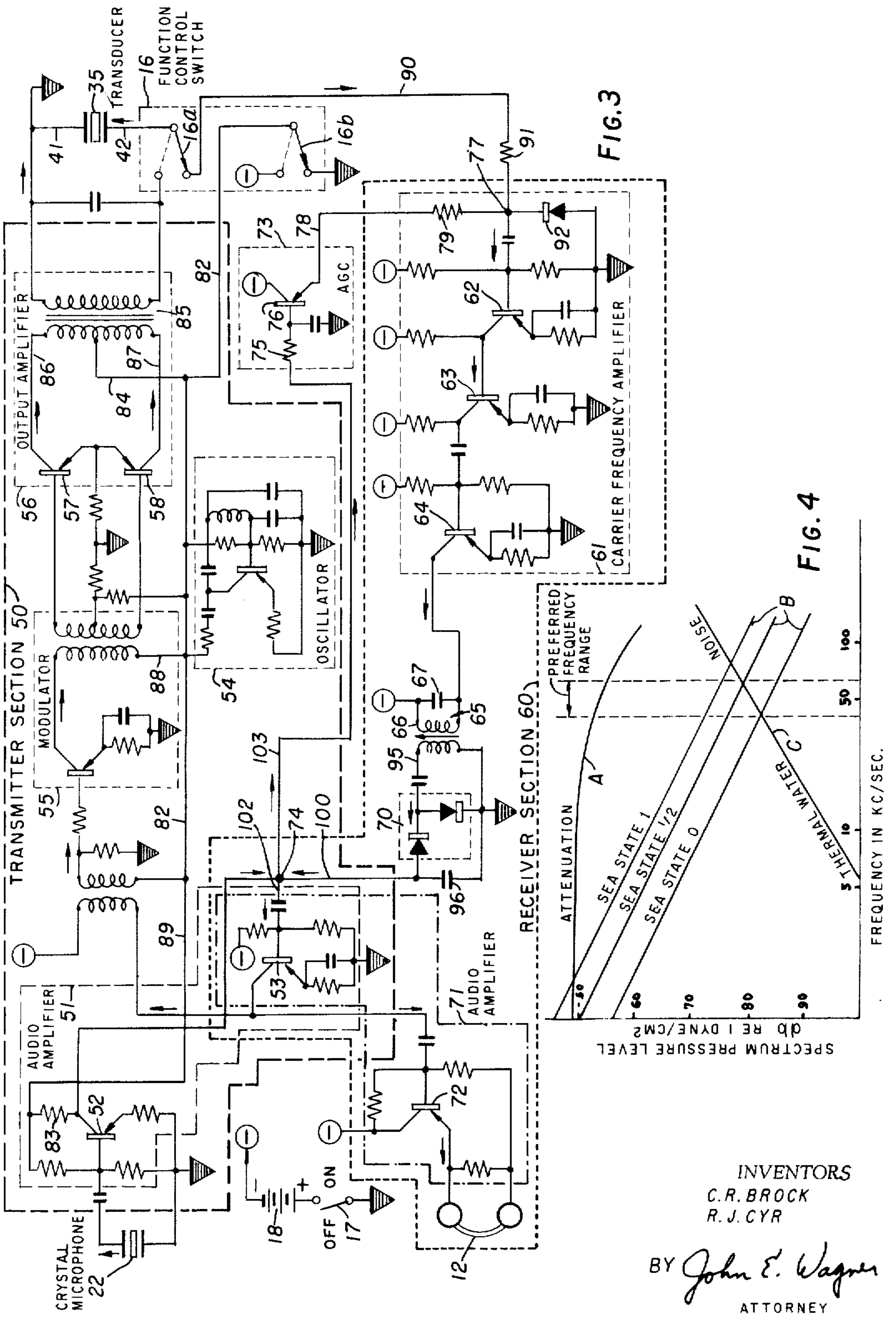
FIG. 3 is an electrical schematic of the apparatus of FIG. 1.
FIG. 4 is a graphical representation of the transmission properties of sea water as a function of frequency.

The circuitry of the underwater telephone system may be seen in FIG. 3. It comprises a transmitter section 50 including an audio amplifier 51 having two stages, transistors 52 and 53 driven by the microphone 22, an oscillator 54 tuned to 50 kilocycles per second, a modulator stage 55, and an output amplifier stage 56 coupling the transmitter to the transducer 35.

The receiver section 60 of the apparatus amploys the transducer 35 as the signal input source coupled through a carrier frequency amplifier 61 made up of three transistor stages 62, 63 and 64, the last of which is coupled through a band pass filter 65 to a crystal detector and voltage doubler 70 for demodulation of receieved signals. Demodulated audio signals from the diode detector 70 are introduced into an audio amplifier 71 including two transistor stages 53 and 72, in that order, which in turn drive the earphone 12. The transistor 53 is common to both the transmitter section audio amplifier 51 and receiver section amplifier 71, and consequently appears in the drawing in the enclosing lines for both amplifiers. The common use of transistor stage 53 not only results in a reduction of components in the apparatus but allows the introduction of sidetone energy into the receiving section 60 during transmitter operation, as explained below.

One further portion of the circuitry is the automatic gain control (AGC) section 73 having its input connected to both the receiving and transmitting sections 50 and 60 at common junction 74 of the input to the amplifier stage 53. The AGC section 73 includes a low pass filter 75 and a transistor stage 76 for developing a unidirectional voltage varying as a function of its input alternating current level. The AGC section serves to control the level of the receiving section 60 by introduction of an AGC voltage into the receiver section input over a lead 78 and resistor 79 at junction 77.

In addition to the transmitting, receiving and AGC sections, the circuit is completed by the power supply and function control switch 16, the power supply comprising simply the battery 18 having the positive terminal connected to the common ground of the apparatus through the on-off switch 17 and the negative terminal connected to each point in the circuit designated by a circled minus sign.

The function control switch 16, commonly termed a press-to-talk switch, comprises a pair of ganged double-throw switches **16*a* and 16*b* which normally rest in the position shown and are spring-returned to that position upon removal of an actuating force. The switch 16*a* normally connects the transducer 35 to the input to the receiver section 60 while the switch 16*b* normally disables the transmitter section 50 by grounding the collectors of transistor 52 through lead 82 and a resistor 83 and transistors 57 and 58 of the output amplifier stage 56 through lead 84, both halves of the center-tapped primary winding of output transformer 85 and leads 86 and 87**.

A complete understanding of the circuit and its operation can best be had by considering the normal operation of the apparatus in both its receiving and transmitting conditions while operated in conjunction with a similar unit worn by a second swimmer, both submerged.

*Receiving operation*

The communications system is brought into operation in the receiving condition merely by actuation of the on-off switch 17, thereby applying battery potential to the collector electrodes of all of the transistors 62, 63, 64, 53 and 72 of the receiver section 60 and the transistor 76 of the AGC amplifier 73. The function switch **16*a* through lead 90 and resistor 41 connects the transducer 35 across the AGC diode 92 of the carrier frequency amplifier 61. Incoming compressional wave energy impinging upon transducer 35 by the piezoelectric effect produces a voltage across the transducer 35 terminals which is applied to the amplifier 61 through the voltage divider action of resistor 91 (e.g., 500 ohms) and the diode 92 in its high impedance condition (e.g., 200,000 ohms). The signal is amplified approximately 75 decibels in the three stages of amplifier 61. The last stage of amplifier 61 is tuned by transformer 66 and capacitor 67 to the carrier frequency (50 kilocycles) with a pass band of approximately 6 kilocycles, thereby largely eliminating unwanted noise. The amplified signal is applied through lead 95 to diode detector 70, where it is demodulated and the carrier frequency shunted to ground through capacitor 96. The resultant audio frequency signal on lead 100 is introduced into audio amplifier 71 and AGC amplifier 73 over common lead 100 to junction 74 and through respective input leads 102 and 103. The audio signal is further amplified by transistor 53 and is coupled through emitter-follower stage 72 to drive the earphone 12**.

*Automatic gain control operation*

The demodulated audio signal at junction 74 is introduced through lead 103 into a low-pass filter 75 of the AGC section 73 to remove all but the low-frequency (100 cycles per second or less) components and the resultant voltage which has a level varying essentially with the carrier amplitude. This resultant voltage amplified in AGC amplifier 73 is applied over lead 78 to provide an incoming signal-controlled variable forward bias to the diode 92 to vary its conduction. Variations in the diode 92 forward resistance produce changes in the impedance match between the transducer 35 and the amplifier 61. The transducer 35 exhibits an A.C. impedance of approximately 30,000 ohms and the input impedance at the desired signal level is similarly 30,000 ohms. As the incoming signal level increases, the AGC voltage increases the conduction of diode 92, reducing the input impedance of amplifier 61 and thereby reducing the energy transfer to the circuit. More important, the voltage divider action of resistance 91 and diode 92 controls the level of signal voltage applied to the amplifier 61. For example, the forward resistance of the diode 92 will vary from nearly infinity in the absence of an AGC signal to nearly a short circuit with full AGC signal present. Between these two extremes, the percentage of the signal appearing thereacross will vary inversely with the ratio of the diode 92 forward resistance and the value of resistance 91.

*Transmitting operation*

Whenever the apparatus is energized, it is converted from the normal receiving condition to the transmitting mode of operation by actuation of the nonlocking press-to-talk switch 16. Closure of this switch results in three separate switching operations to enable the transmitter and to partially disable the receiver. First, the switch contacts 16*a* transfer the transducer 35 from its connection to the receiver amplifier 61 to the tuned transmitter output amplifier 56. Second, battery power is applied to the leads 82, 84, 88 and 89 which are normally grounded. The transmitter section 50 is then capable of amplifying voice signals picked up by microphone 22 in the audio stage 51 modulating a carrier wave generated by the oscillator 54 in the modulator 55, and amplifying the modulated carrier in the push-pull output stage 56 to apply across the terminals of the transducer 35 a varying potential which excites the electroceramic transducer 35 to produce an output in the order of 40 acoustic milliwatts (minimum) radiated into the surrounding medium.

The third switching operation occurring in the transmitting mode involves the AGC amplifier 73. The battery potential applied to the collector electrode of the transmitter transistors is also applied to the base circuit of the AGC amplifier 73, driving it into saturation and causing the heavy drain of current (10 ma.) through the lead 78 and particularly diode 92, thereby desensitizing the receiver section by effectively short-circuiting its input. This allows the use of a high-sensitivity receiver, yet minimizes unwanted cross-coupling between the output of the transmitter and the input of the receiver while in the transmit mode.

Although the output stage of the transmitter is isolated from the receiver, the audio frequency stage 51 includes a transistor 53 which is common to the receiver audio amplifier 71. Through this common stage, sidetone energy from the transmitter 50 is introduced into the receiver section to drive the earphone at a reduced level during transmission. The presence of a sidetone connection between the transmitter and receiver sections in a conventional telephone system is considered desirable, and in an underwater telephone is virtually a necessity because there is no comparable air path for speech energy to reach the telephone user's ears. Without the sidetone connection, the swimmer would lack assurance that his telephone was operative on transmission, and further would have no way of monitoring his own speech quality.

*Transmission characteristics*

As indicated above, design for intelligibility of received speech is the major consideration in the success of an underwater telephone in contrast to prior art systems following more classic underwater sonar system parameters. The swimmer, breathing through his mouth at the same time that he speaks, produces breath noises several orders of magnitude greater than when speaking in air, resulting in an extremely noisy signal at the input to the system. Further interference or distortion in the rest of the transmitter, the transmission medium and the matching receiver could reduce the signal to unintelligible garble. The minimization of distortion in the electronic sections of the apparatus is accomplished by the AGC circuit and linear low-level modulation.

The remaining source of signal degradation is the transmission medium, normally sea water. Heretofore underwater communication systems have classically employed transmission at a frequency of 10 kilocycles per second or less because of the reduced attenuation at lower frequencies. However, we have discovered that the normal adequate maximum range for underwater communication by swimmers is 500 yards. The attenuation as a function of frequency at that 500-yard range is illustrated in FIG. 4 as curve A and is slight (5 decibels or less) for frequencies up to 60 kilocycles above which attenuation increases markedly. This indicates that the frequency-attenuation factor is not significant below 60 kilocycles per second at ranges of 500 yards or less. On the other hand, the sea noises caused by wave action, boats, engines, etc., exhibit predominately low-frequency (10 kilocycles and below) components.

FIG. 4 shows, as curve B, the water noise for sea state 0 (dead calm), sea state ½ (calm—sheltered waters) and sea state 1 (calm—exposed seas) constituting a function decreasing on virtually a straight line at a slope of 6 db per octave. One further significant characteristic of the medium is the thermal noise of sea water as a function of the frequency of input energy. Although insignificant at extremely low frequencies (5 kilocycles per second) or lower, the thermal noise increases almost linearly at a slope of 6 db per octave. The change in noise level due to sea state and thermal noise, as a function of frequency, greatly exceeds the normal range attenuation function. Consequently the optimum operating frequency is determined by the minimum point of these characteristics (curves B and C) occurring at 45 kilocycles per second for sea state 0. For sea state ½ the optimum frequency is slightly higher, 60 kilocycles per second, and for sea state 1 reaches 80 kilocycles per second. At the last frequency the attenuation curve begins a marked increase. The frequency range for the system therefore is 45 to 60 kilocycles per second and the preferred frequency for most operational conditions is 50 kilocycles per second. The apparatus shown in FIG. 1 operates at the optimum 50 kilocycles per second in the preferred range, and the transducer of barium titanate is dimensioned to resonate at that frequency, its height 1.15 inches and diameter 0.5 inch determining its resonant frequency.

The wall thickness is in the order of .12 inch.

*Summary*

In accordance with this invention an integral headset package constitutes a complete underwater telephone station employing amplitude-modulated compressional waves. The electronic package, transducer, earphone, battery pack, and all controls are mounted on a headband and as a single self-contained unit. The transducer centermost on the headset is subject to directional orientation merely by hand movement.

The electronic circuit of the apparatus employs solid state active elements exclusively, and particularly employs common usage of both the AGC circuit and an audio stage in both transmitting and receiving to achieve not only a reduction in necessary components, but to provide the additional features of sidetone signal production and isolation between the transmit and receiving sectors during transmission.

Additionally the system operates in a frequency range which is the least susceptible to interference of water or man-made noise while subject to only moderate attenuation, whereby the received signal is well above normal noise levels and clearly intelligible.

Although for the purpose of explaining the invention a particular embodiment thereof has been shown and described, other modifications within the spirit and scope of this invention will occur to persons skilled in the art. The scope of this invention is only limited by the appended claims.

We claim:

1. An underwater telephone station comprising:

a headset including a pair of ear-covering portions and a flexible headband to be worn by an underwater swimmer;

an earphone within one of said ear-covering portions;

a battery pack in the other of said ear-covering portions;

an electronic circuit package mounted on said headband;

a microphone connected to said electronic circuit package;

means including said headband for conductively connecting said earphone, electronic circuit package and battery pack;

and an electromechanical transducer mounted on said headset for coupling energy between the electronic circuit package and the surrounding medium.

2. The combination in accordance with claim 1 wherein said transducer comprises an electroceramic element having a resonant frequency in the range of 45 to 60 kilocycles per second, and said electronic circuit package includes a transmitter and a receiver operative to generate or detect modulated carrier waves of the 45- to 60-kilocycle-per-second range.

3. An underwater telephone comprising:

a headset including a resilient headband dimensioned to extend from one ear region over the head of the user to the opposite ear region;

an earphone secured to said headband and positioned for radiation of energy through said headband to one ear of the user;

a battery package containing batteries for powering the apparatus;

said battery package secured to said headband in position over the user's opposite ear;

a circuitry package secured to said headband in the region between the battery package and earphones;

an electromechanical transducer mounted on said headband whereby directional control of transmission and reception is accomplished by movement of the user's head;

and a transmitter adapted to be positioned on the air passage of underwater breathing apparatus to detect speech of the user.

4. The combination in accordance with claim 3 wherein said headband is of conductive material and constitutes a common electrical ground conductor for said battery electronic circuit package and earphone.

5. The combination in accordance with claim 3 wherein said headband is in acoustic conduction relationship with said earphone and both of the user's ears.

6. An underwater telephone comprising:

a headset including a flexible headband to be worn by an underwater swimmer;

an earphone secured to said headband and positioned for radiation of energy through said headband to one ear of the user;

a battery package containing a battery for powering said telephone secured to said headband;

an electronic circuit package mounted on said headband;

a microphone connected to said electronic circuit package;

means including said headband for conductively connecting said earphone, electronic circuit package and battery pack;

and an electromechanical transducer mounted on said headset for coupling energy between the electronic circuit package and the surrounding medium.

7. The combination in accordance with claim 6 wherein said headband is in acoustic conduction relationship with said earphone and both of the user's ears.

8. The combination in accordance with claim 6 wherein said transducer comprises an electroceramic element having a resonant frequency in the range of 45 to 60 kilocycles per second, and said electronic circuit package includes a transmitter and a receiver operative to generate or detect modulated carrier waves of the 45- to 60-kilocycle-per-second range.

9. The combination in accordance with claim 6 wherein said electronic circuit package includes a normally disabled transmitter having said microphone connected thereto;

a normally enabled receiver including an earphone for reproduction of received signals;

switch means normally connecting said transducer to the input of said receiver, said switch means being operative to switch said transducer from said receiver to said transmitter and to enable said transmitter;

and means responsive to energizing of said transmitter for effectively short-circuiting the input to said receiver.

References Cited by the Examiner

UNITED STATES PATENTS

| | | | |
|---|---|---|---|
| 2,144,936 | 1/1939 | Rochow | 325—22 |
| 2,369,193 | 2/1945 | Vrooman | 325—21 |
| 2,400,796 | 5/1946 | Watts et al. | 340—3 |
| 2,798,902 | 7/1957 | Kursman et al. | 340—5 |
| 2,939,949 | 6/1960 | Curtis | 325—22 |

OTHER REFERENCES

"Underwater Telemetry for Oceanographic Research," Electronics, vol. 35, No. 2, Jan. 12, 1962 (pp. 53–55 relied on).

CHESTER L. JUSTUS, *Primary Examiner.*